United States Patent [19]

Fargier et al.

[11] Patent Number: 4,869,350
[45] Date of Patent: Sep. 26, 1989

[54] WEAR INDICATOR FOR A FRICTION MEMBER OF AN AUTOMOTIVE BRAKE

[75] Inventors: Eric Fargier, Neuilly-Plaisance; Jean-Claude Mery, Pavillons sous Bois, both of France

[73] Assignee: Bendix France, Drancy, France

[21] Appl. No.: 215,095

[22] Filed: Jul. 5, 1988

[30] Foreign Application Priority Data

Jul. 24, 1987 [FR] France .................. 87 10538

[51] Int. Cl.$^4$ ............................................. F16D 66/02
[52] U.S. Cl. ................................... 188/1.11; 116/208; 340/454
[58] Field of Search .................. 188/1.11; 116/208; 340/52 A, 52 B

[56] References Cited

U.S. PATENT DOCUMENTS

| | | | |
|---|---|---|---|
| 3,556,258 | 1/1971 | Winge et al. | 188/1.11 |
| 3,689,880 | 9/1972 | McKee et al. | 340/52 A |
| 3,716,113 | 2/1973 | Kobayashi et al. | 188/1 A |
| 3,882,448 | 5/1975 | Shibatani et al. | 340/52 A |
| 4,016,533 | 4/1977 | Ishikawa et al. | 340/52 A |
| 4,188,613 | 2/1980 | Yang et al. | 340/528 X |

FOREIGN PATENT DOCUMENTS

| | | |
|---|---|---|
| 0227538 | 7/1987 | European Pat. Off. . |
| 2257250 | 11/1972 | Fed. Rep. of Germany . |
| 2183379 | 12/1973 | France . |
| 2403490 | 4/1979 | France . |
| 2418387 | 9/1979 | France . |
| 2450979 | 10/1980 | France . |
| 2485133 | 12/1981 | France .................. 188/1.11 |
| 2497309 | 7/1982 | France .................. 188/1.11 |
| 2566495 | 12/1985 | France .................. 188/1.11 |
| 2107013 | 4/1983 | United Kingdom ....... 188/1.11 |

*Primary Examiner*—Andres Kashnikow
*Assistant Examiner*—Richard Potosnak
*Attorney, Agent, or Firm*—Larry J. Palguta; Ken C. Decker

[57] ABSTRACT

The wear indicator comprises essentially a coaxial cable (4, 5) of which the conducting core (4) and the conducting sleeve (5) are connected electrically by a socket (6, 6', 6'', 6'41). One bared end of the core (4) is disposed on a wear limit plane of a lining forming part of a friction member. A rotating member, disc or drum then cuts the end of the core when the lining reaches its permissible wear limit.

8 Claims, 3 Drawing Sheets

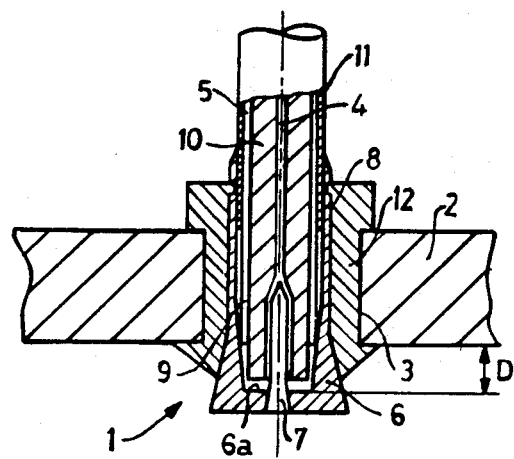
FIG_1
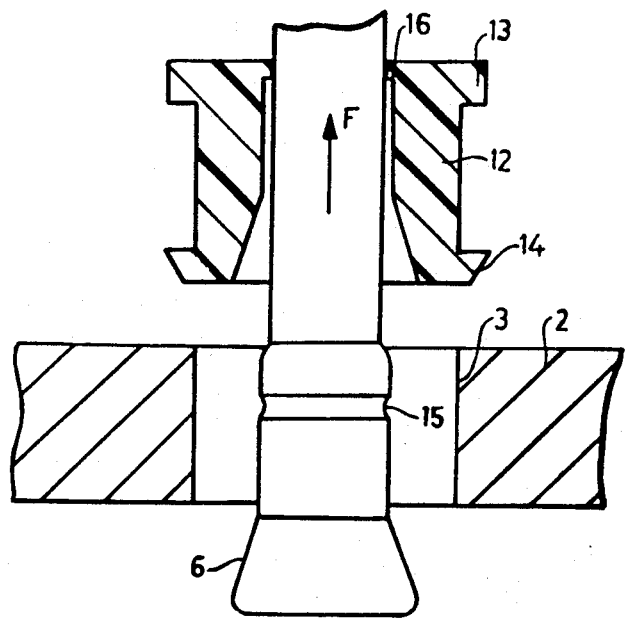
FIG_2

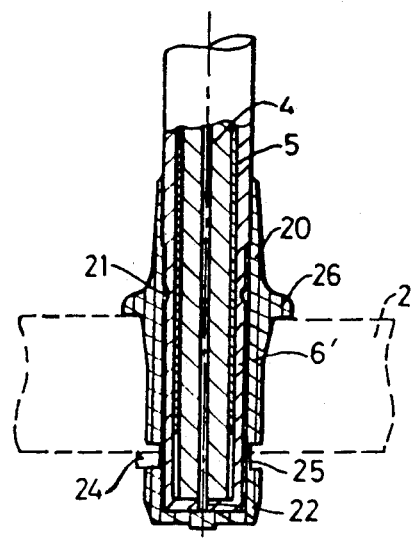
FIG_5
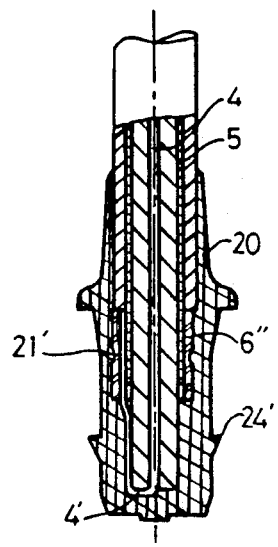
FIG_6
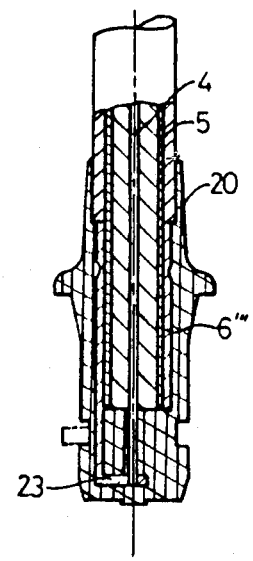
FIG_7

WEAR INDICATOR FOR A FRICTION MEMBER OF AN AUTOMOTIVE BRAKE

The present invention relates to a friction member wear indicator, and, more particularly, to such an indicator designed to equip a friction member of disc or drum brake for automobile vehicles.

Such indicators are known which act by grounding to the vehicle by an electrical conductor when the thickness of a lining of the friction member, perpendicular to its wear plane, becomes less than a predetermined value below which the quality and the reliability of the braking are considered as unacceptable. Usually, this grounding results from the wear of a sleeve, protecting the conductor, by a metal disc or drum integral in rotation with a vehicle wheel and forming part of the brake, the conductor then being placed in contact with this disc or drum. An electrical circuit sensitive to the grounding of the conductor then controls the passing of a current through the conductor, which current causes a warning light to be illuminated. This signal warns the user of the vehicle that the friction member is worn and thus must be replaced.

Owing to the fact that a current is not able to pass through the conductor until grounding has taken place, it is not possible to test the correct functioning of the circuit and of the warning light before the friction member has reached its wear limit.

To mitigate this disadvantage, some wear indicators have been designed in which the electrical conductor forms a loop which is cut when the wear limit of the associated friction member is reached. The electrical continuity of the loop may then be tested at any time before the breaking of this loop.

It is therefore an object of the present invention to provide a wear indicator of this type, which ensures a clean break of the loop when the wear limit of the associated friction member is reached, which is easy and reliable to install and of low cost to manufacture.

The object of this invention is attained, as well as others which will appear later on, with a wear indicator of a friction member for automobile vehicle brake, designed to be mounted on the friction member so that a conductor of electrical member forming part of the indicator is rubbed against by a rotating member forming part of the brake when the friction member reaches a thickness less than a predetermined value due to its wear by this rotating member, the conductor member passing tangentially in the plane of maximum permissible wear of the friction member, characterized in that the conductor member is made up of two electric wires coaxially connected one to the other by a socket, which conducts electricity.

The invention will now be described by way of example with reference to the accompanying drawing, in which FIG. 1 depicts a view in axial cross-section of a first embodiment of the wear indicator according to the invention;

FIG. 2 is an exploded view which illustrates the mounting operations of the indicator of FIG. 1, on a lining carrier plate of a friction member for automobile vehicle brake;

FIGS. 3 to 7 depict, in axial cross-section, five other embodiments of wear indicators according to the invention.

Figure 3:
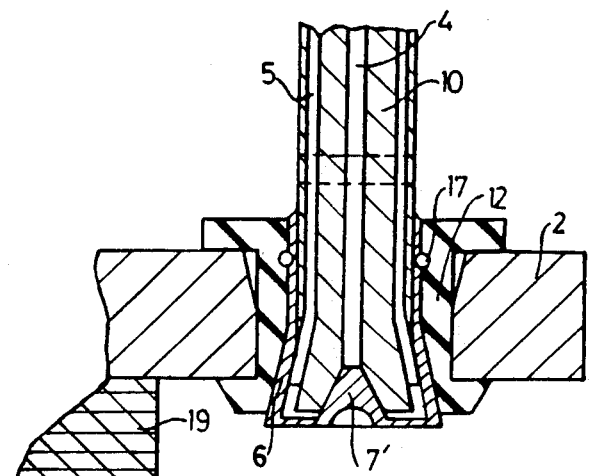

Reference is made to FIG. 1 of the drawing which depicts a wear indicator according to the invention, marked generally 1, fixed on a lining carrier plate 2 of a friction member for automobile vehicle brake. In the following, the invention will be described in its implementation for a disc brake. However, it is clear that the invention is also immediately applicable to a friction member for drum brake.

The indicator 1 passes through a hole 3 drilled in the plate 2 in an area of this which is separated from a friction lining carried by this plate. According to the invention, the indicator comprises a conducting member which takes the form of a coaxial cable made up of two concentric electrical wires, respectively a core 4 and a sleeve 5. A connecting member such as a socket 6 establishes an electrical contact between the core and the sleeve. The socket is made in an electrical conducting material which is also sufficiently soft (for example, zinc) to wear when it comes into contact with a disc forming part of a disc brake equipped with friction members fitted with indicators according to the invention. The socket is shaped in such a way that, after placing in position on the lining carrier plate 2, its inner surface 6a parallel to the plane of rotation of the disc is separated from the adjacent face of the plate 2 by a distance D which corresponds to the minimum permissible thickness of the lining for the friction member.

So, after successive brakings have worn this lining, the brake disc comes into contact with the end of the socket. In accordance with an implementation of the indicator given only as an example, the wires 4, 5 are then grounded and a warning light, controlled by an appropriate electrical circuit connected to these wires, illuminates, only during periods of braking, to signal the commencement of wear of the linings. If the wear of the indicator continues in spite of the periodic alert which thus manifests itself, there comes a time when the end of the socket 6 is completely worn (the disc then being the distance D away from the plate 2). The socket at this moment no longer establishes contact between the core 4 and the sleeve 5 due to the fact that a central contact tip 7, forming part of this socket and placed in electrical contact with the core 4, is then cut off from what remains of the socket. The electrical circuit connected to the wires 4, 5 of the wear indicator is then sensitive to this situation to trigger the sending of a signal, for example, by exciting a continuous warning light. The driver of the vehicle is thus warned that he is compelled to replace the friction member or members which have reached its or their wear limit.

The socket of the wear indicator of FIG. 1 comprises a cylindrical part 8 which is crimped onto a bared part 9 of the sleeve 5 to establish a good electrical contact. The tip 7 is embedded in a coating such as an internal insulating casing 10 such that there is ensured a good electrical contact with the conducting core 4 protected by this casing 10. A second, external, insulating casing 11 ensures the protection of the whole of the coaxial cable.

Reference is now made to FIG. 2, which illustrates the operations for mounting the indicator of FIG. 1 on the lining carrier plate 2. A bush 12, split or semi-split, is slipped onto the cable, the socket 6 of the indicator being entered in the hole 3. These members being approximately in the positions shown in FIG. 2, the bush 12 is force-fitted in the hole 3 profiting from the distortability of this split bush. Once this is fixed in the hole 3 so that its end flanges 13 and 14 are resting against two opposite faces of the plate 2, the cable is pulled in the direction of the arrow F in order that the socket 6 jams itself in the bush 12.

The socket 6 is hollowed out with a groove 15 arranged to interact with an annular fillet 16 formed in the central bore of the bush 12 level with the base near the flange 13. The socket 6 and the bush 12 nave complementary self-locking tapers, as shown in FIGS. 1 and 2. The cable is no longer pulled when this fillet 16 enters the groove 15 of the socket, this interaction of the fillet with the groove defining the correct position of the indicator on the plate 2.

Other embodiments of the wear indicator according to the invention are shown in FIGS. 3 to 7. In these figures, the members or components similar to those for the indicator of FIG. 1 are marked by the same numbers possibly bearing a "prime" or "double prime", and their description, therefore, is not referred to again in the following.

Figure 4:
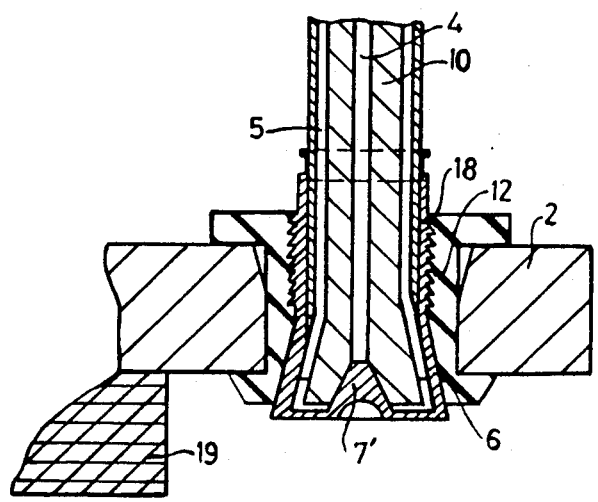

The indicators of FIGS. 3 and 4 are of the same type as that of FIG. 1. In FIG. 3, a split ring 17 interacts with two annular grooves hollowed out respectively in the socket 6 and the bush 12, to lock the socket in this bush and to define the final working position of the socket and, in particular, that of its end intended to wear under the action of the rubbing produced, for example, by the disc of a disc brake.

In FIG. 4, sets of annular ridges 18, male and female, formed respectively on the socket 6 and on the bush 12 play the part of the ring 17 and the associated grooves of the indicator of FIG. 3, or that of the groove 15 and of the annular fillet 16 of the indicator of the FIG. 2.

In FIGS. 3 and 4, a part of a friction lining 19 carried by the lining carrier plate 2 is shown. It is clear from these figures that the indicator is mounted on this plate in a zone separated from that which accepts the lining 19. However, the scope of the invention would not be departed from by placing the indicator on a part of the plate which is covered by the lining, provided that a location is drilled in the latter for this indicator.

Again, in FIGS. 3 and 4, one other means is shown of establishing a contact between the socket 6 and the conducting core 4 of the indicator. This means comprises a central protuberance 7' which is embedded in the insulation 10 to come into contact with this core. This protuberance plays the part of the tip 7, set in, of the socket, for the indicator of FIG. 1.

Three other embodiments, closely related, of the indicator according to the invention are shown FIGS. 5 to 7. Essentially these are distinguished from the embodiments of FIGS. 1 to 4 in that they comprise an overmolded casing 20 which plays the part of the bush 12 for the indicators in FIGS. 1 to 4, to fix the indicator on the lining carrier plate.

In FIG. 5, the indicator shown comprises a socket 6' crimped at 21 on a bared part of the sleeve, this socket being drilled at its end with an axial hole 22 in which the bared end of the conducting core 4 for the coaxial cable used in the indicator according to the invention passes through. A soldered joint level with the hole 22 may complete the electrical connection of the core 4 and the socket 6.

In FIG. 6, a bared part of the core 4 is folded back on the insulation of the cable, the electrical contact between the core 4 and the sleeve 5 being ensured by a socket in the form of a metal bush 6'' crimped at 21'. In this embodiment, it is the wear of the part 4' of the core 4 folded back on the end of the coaxial cable which causes the opening of the electrical circuit 4, 5 and the detection of the wear limit of the associated lining.

In FIG. 7, a variation of the embodiment of FIG. 5 is shown, in which the end 23 of the socket 6''' is substantially semi-circular, which allows the insertion of the bared end of the core 4 in a slot cut in this end, rather than in a hole. The installation of the core in the socket is made easier by this.

For the embodiments of FIGS. 5 to 7, once the socket is mounted on the coaxial cable in order to establish an electrical continuity between the core and the sleeve, a casing 20 in plastic material overmolded on the socket and the end of the cable, with the arrangement of parts shown by these figures. The casing 20 comprises means such as an annular abutment 26 designed to bear on the face of the lining carrier plate 2 which does not have this lining, to define the distance D which separates the end of the indicator from the adjacent face of the plate 2, at the wear limit of the lining.

The indicators of FIGS. 5 to 7 are easier to install than those of FIGS. 1 to 4, insofar as they do not call for the use of a split bush like the bush 12.

It is sufficient to insert the indicator conforming to any one of FIGS. 5 to 7 in the hole provided to receive it. It is then retained there by locking means such as a circlip 24 which is inserted in an annular groove 25 molded in one piece with the casing 20 (FIGS. 5 and 7). According to one other solution shown in FIG. 6, this circlip and this groove are replaced by a clippable step 24' which is force-fitted through the hole 3 of the lining carrier plate to prevent the extraction of the indicator from this hole later on.

So, due to the invention, wear indicators of the loop type or with "dual wire" are produced which make an unexpected application of a coaxial cable well known in other applications, where the core and the sleeve are insulated carefully one from the other, contrary to that which is established in the indicators according to the invention. The indicators thus obtained are simple, inexpensive to make and easy to install because the axial symmetry of the cable utilized lends itself to an entirely symmetrical construction which is well suited for a fixing in a circular hole of a friction member lining carrier plate for automobile vehicle brake. Moreover, the socket of the indicator according to the invention may be made in a softer material than that of the conductor wires, so helping the cutting of the conductor member of the indicator by wearing down to the wear limit of the friction member.

We claim:

1. A wear indicator for a friction member of an automotive brake, designed to be mounted on the friction member so that an electrical conductor member forming part of the indicator is rubbed against by a rotating member forming part of the brake when the friction member reaches a thickness less than a predetermined value due to wear of the friction member by the rotating member, the conductor member passing tangentially in a plane of maximum permissible wear of the friction member, said conductor member comprising an electric coaxial cable having a conducting core and a conducting sleeve insulated one from the other by an insulating coating and connected by a conducting socket, the conducting socket connecting bared ends of said core and sleeve.

2. The wear indicator in accordance with claim 1, wherein said conducting socket is embedded in an overmolded casing comprising means for abutting which defines an axial position of the indicator on the friction member and means for locking said indicator in said axial position on the friction member.

3. The wear indicator in accordance with claim 1, further comprising a bush for fixing said socket in a hole in a plate of said friction member, said bush and said socket having complementary tapers.

4. The wear indicator in accordance with claim 1, wherein said socket comprises a tip which ensures an electrical contact with said conducting core.

5. The wear indicator in accordance with claim 1, wherein the bared end of said core is folded back against said insulating coating so as to come into contact with the bared end of said sleeve, said socket being a bush crimped on said electric coaxial cable in order to ensure electrical contact between the sleeve and core.

6. A wear indicator for a friction member of an automotive brake, designed to be mounted on the friction member so that an electrical conductor member forming part of the indicator is rubbed against by a rotating member forming part of the brake when the friction member reaches a thickness less than a predetermined value due to wear of the friction member by the rotating member, the conductor member passing tangentially in a plane of maximum permissible wear of the friction member, said conductor member comprising an electric coaxial cable having a conducting core and a conducting sleeve insulated one from the other by an insulating coating, a bared end of said core being folded back against said insulating coating so as to come into contact with a bared end of said sleeve, and a conducting socket being crimped on said electric coaxial cable in order to ensure an electrical contact between said sleeve and core.

7. The wear indicator in accordance with claim 6, wherein said socket is embedded in an over-molded casing comprising means for abutting which defines an axial position of the indicator on the friction member and means for locking the indicator in said axial position on the friction member.

8. The wear indicator in accordance with claim 6, further comprising a bush for fixing said socket in a hole in a plate of said friction member, said bush and said socket having complementary tapers.

* * * * *